United States Patent
Wnuk

(10) Patent No.: US 8,745,380 B2
(45) Date of Patent: Jun. 3, 2014

(54) PRE-ENCODING A CACHED CERTIFICATE REVOCATION LIST

(75) Inventor: Andrew Wnuk, San Jose, CA (US)

(73) Assignee: Red Hat, Inc., Raleigh, NC (US)

(*) Notice: Subject to any disclaimer, the term of this patent is extended or adjusted under 35 U.S.C. 154(b) by 385 days.

(21) Appl. No.: 12/714,312

(22) Filed: Feb. 26, 2010

(65) Prior Publication Data

US 2011/0213967 A1    Sep. 1, 2011

(51) Int. Cl.
 H04L 29/06    (2006.01)
 H04L 9/32    (2006.01)

(52) U.S. Cl.
 CPC ................................ *H04L 9/3268* (2013.01)
 USPC .......................................................... 713/158

(58) Field of Classification Search
 USPC .......................................................... 713/158
 See application file for complete search history.

(56) References Cited

U.S. PATENT DOCUMENTS

| | | | |
|---|---|---|---|
| 2008/0189545 A1* | 8/2008 | Parkinson | 713/158 |
| 2009/0063855 A1* | 3/2009 | Parkinson | 713/158 |
| 2010/0325429 A1* | 12/2010 | Saha et al. | 713/158 |
| 2011/0161663 A1* | 6/2011 | Nakhjiri | 713/158 |

OTHER PUBLICATIONS

Java SE 6 (Dec. 11, 2006).*
Burton S. Kaliski Jr., "A Layman's Guide to a Subset of ASN.1, BER, and DER", An RSA Laboratories Technical Note, Nov. 1, 1993, 30 pages.
Red Hat Certificate System 8.0, Admin Guide, Chapters 6 and 7, Jul. 22, 2009, updated on Sep. 9, 2009, 46 pages.
D. Cooper, et al., "Internet X.509 Public Key Infrastructure Certificate and Certificate Revocation List (CRL) Profile", May 2008, 146 pages.

* cited by examiner

*Primary Examiner* — David Pearson
(74) *Attorney, Agent, or Firm* — Lowenstein Sandler LLP

(57) ABSTRACT

A method and system for pre-encoding a cached CRL is described.

21 Claims, 4 Drawing Sheets

PRE-ENCODING A CACHED CERTIFICATE REVOCATION LIST

TECHNICAL FIELD

Embodiments of the invention relate to the field of identity management systems, and more particularly, to pre-encoding cached certificate revocation lists of identity management systems.

BACKGROUND

Identity management systems are information systems that support the management of identities. In particular, an identity management system establishes the identity of a subject or an object by linking a name (or number) with the subject or object. The identity management system may also describe the identity, for example, by assigning one or more attributes applicable to the particular subject or object to the identity. The identity management system may also modify the identity, such as by linking a new or additional name, or number, with the subject or object and/or change one or more attributes applicable to the particular subject or object. The identity management system can record and/or provide access to logs of activity by the identity.

One of the cornerstones of establishing a secure network environment is making sure that access is restricted to people who have the right to access the network. This access is allowed when the user can authenticate to the identity management system, meaning the user can verify his identity. The authentication may be managed by a public key infrastructure (PKI), such as implemented by a certificate system. For PKI, users and machines may present digital certificates to verify their identity. A digital signature is a mathematical representation of a message, using public key cryptography, which identifies the originator of the message, in a non-forgeable manner. Public key cryptography requires the use of two mathematically related keys—a public key and a private key (collectively referred to as a key pair). The private key is kept private by a single owner, and is not distributed to anyone else. The owner uses his or her private key, in conjunction with cryptographic algorithms, to digitally sign a message. The public key is made public, and can be used by anyone to verify the digital signature on a message. The fact that these two keys are mathematically related ensures that only a single private key can generate a digital signature that is verifiable by the corresponding public key, making the digital signature unforgeable. A digital certificate, commonly referred to as a certificate, is an electronic document used to identify an individual, a server, a company, or another type of entity and to associate that identity with a public key. The digital certificate binds a person's identity to his or her public key, and consequently, to his or her private key, and may be used to verify digital signatures. Digital certificates and digital signatures then provide the foundation for secure transactions over a network, such as the Internet.

Certificate authorities (CAs) validate identities and issue certificates. CAs can be either independent third parties or organizations running their own certificate-issuing server software, such as a certificate system. Before issuing a certificate, a CA must confirm the user's identity with its standard verification procedures. The certificate issued by the CA binds a particular public key to the name of the entity identified by the certificate. In addition to the public key, the certificates include the name of the entity it identifies, an expiration date, and the name of the CA that issued the certificate.

The CA can revoke a certificate or put a certificate on hold using a certificate revocation list (CRL). A CRL is a list of certificates that have been revoked or are no longer valid, and therefore should not be relied upon. The CRL may be a publicly available list of revoked certificates. A certificate is irreversibly revoked if, for example, it is discovered that the CA had improperly issued a certificate, or if a private-key is thought to have been compromised. Certificates may also be revoked for failure of the identified entity to adhere to policy requirements such as publication of false documents, misrepresentation of software behavior, or violation of any other policy specified by the CA operator or its customer. The most common reason for revocation is the user no longer being in sole possession of the private key (e.g., the token containing the private key has been lost or stolen). A certificate is put on hold to note the temporary invalidity of the certificate (e.g., if the user is unsure whether the private key has been lost). If, in this example, the private key was found and nobody had access to it, the status could be reinstated, and the certificate is valid again, thus removing the certificate from future CRLs.

A CRL issuer can publish a CRL immediately after a certificate has been revoked or released from being on hold. All CRLs have a lifetime during which they are valid (e.g., 24 hours or less). During a CRL's validity period, PKI-enabled applications may consult the CRL to verify a certificate prior to use. Conventional systems that publish the CRL every time a certificate is revoked or released from hold may engage a directory server for a considerable amount of time, especially if the CRL is large.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
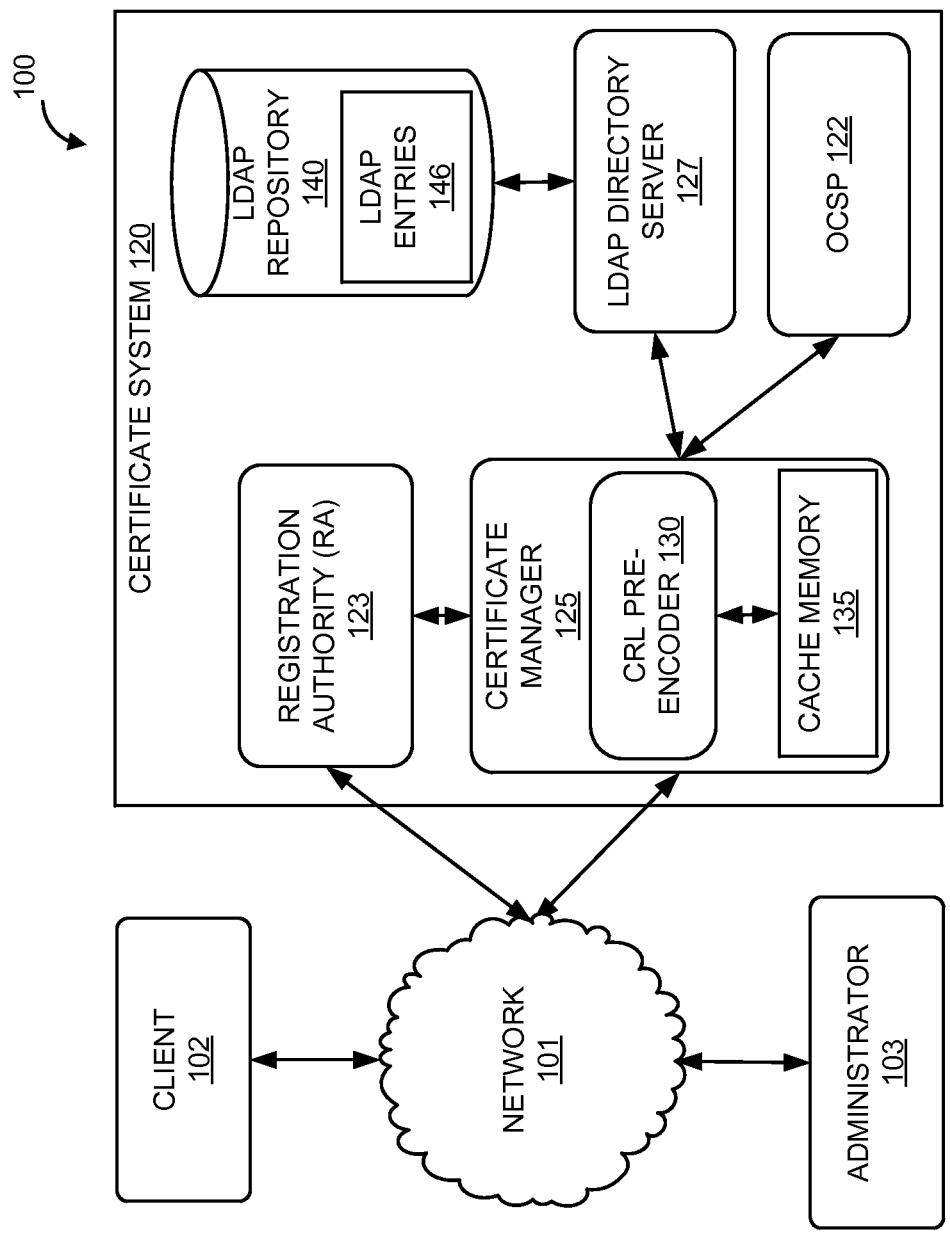
FIG. 1 is a block diagram of exemplary system architecture in which embodiments of a certificate system, having a CRL pre-encoder, may operate.

A method and system for pre-encoding a cached CRL is described. In one embodiment, a method includes periodically searching a cached CRL to detect an entry of un-encoded information associated with at least one of the revoked certificates of the cached CRL. When the method detects an entry of un-encoded information, the method encodes the respective un-encoded information and stores the encoded information in the respective entry of the cached CRL. In one embodiment, the method encodes the entries of the cached CRL into binary encodings for transmission over a network, such as using Hypertext Transport Protocol (HTTP). In another embodiment, the method encodes the cached CRL using Distinguished Encoding Rules (DER) of the Abstract Syntax Notation One (ASN.1) standard for transmission of the cached CRL over a network. Alternatively, other encoding rules and other standards may be used. In one embodiment, the method generates, signs, and publishes a CRL using the cached CRL. Since the entries of the cached CRL are encoded information, the cached CRL can be readily communicated over the network, further reducing the time consumed by the method to generate and publish the CRL.

Embodiments of the present invention provide an improved certificate system. Instead of publishing the CRL every time a certificate is revoked or released from hold, as done conventionally, the certificate system can maintain a cached CRL, which contains a list of revoked certificates by the CA. When initially cached, the entries of the cached CRL include un-encoded information. By pre-encoding the un-encoded entries of the cached CRL, the certificate system can reduce the amount of time the directory server is engaged in publishing a CRL, as well as the amount of time needed to generate the CRL for publishing from the cached CRL, since the entries of the cached CRL have already been encoded for transmission.

In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "searching," "encoding," "storing," "generating," "signing," "publishing," "approving," "authenticating," "processing," "computing," "calculating," "determining," "displaying," or the like, refer to the actions and processes of a computer system, or similar electronic computing systems, that manipulates and transforms data represented as physical (e.g., electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer system specifically programmed by a computer program stored in the computer system. Such a computer program may be stored in a computer-readable storage medium, such as, but not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions.

FIG. 1 is a block diagram of exemplary system architecture 100 in which embodiments of a certificate system 120, having a CRL pre-encoder 130, may operate. The architecture 100 includes a client workstation 102, an administrator workstation 103 and a certificate system 120, each coupled to the network 101 that communicates any of the standard protocols for the exchange of information. The network 101 may be a Local Area Network (LAN) and may be incorporated into the same physical or logical system, or different physical or logical systems. Alternatively, the certificate system 120 and client 102 may reside on different LANs that may be coupled together via the Internet but separated by firewalls, routers, and/or other network devices. Alternatively, the network 101 may represent other types of public or private networks or any combination thereof, such as an intranet, an extranet, a cellular network, the Internet, or any combination thereof. The network connections may be LAN connections, Internet connections, Wi-Fi connections, 3G connections, or the like, and may use various types of protocols to communicate data to and from the certificate system 120, administrator workstation 103 and the client workstation 102.

The certificate system 120 may be hosted on one or more machines including one or more server computers, gateways or other computing systems. In one embodiment, the certificate system 120 resides on multiple servers, including a CA server that hosts the certificate manager 125, and the end users and/or agents on the client 102 can interact with the certificate system 120 via web browser applications on the client 102. It should be noted that various other network configurations can be used including, for example, hosted configuration, distributed configurations, centralized configurations, etc. The certificate system 120 includes various certificate system subsystems, including an online certificate status responder (OCSP) 122, a Lightweight Directory Access Protocol (LDAP) directory server 127, a registration authority (RA) 123, and a certificate manager 125.

The certificate manager 125 may operate as a CA that can issue, renew, revoke, and publish a wide variety of certificates, for servers, for users, for routers, for other subsystems, and for file or object signing. The certificate manager 125, also referred to as a CA server, can be implemented as software, hardware, firmware or any combination thereof. The certificate manager 125 is the core of a CA's Public Key Infrastructure (PKI). The PKI is a set of hardware, software, people, policies, and procedures needed to create, manage, distribute, use, renew, and revoke digital certificates. The certificate manager 125 can also compile and publish certificate revocation lists (CRLs) as described in more detail below. In one embodiment, the certificate manager 125 includes the CRL pre-encoder 130 and cache memory 135. The operations of the CRL pre-encoder 130 are described in more detail below with respect to FIG. 2-4.

In one embodiment, the cache memory 135 stores a cached CRL, which is used to generate a CRL for publishing. In one embodiment, the cached CRL is implemented as a hash table, which is a data structure that uses a hash function to efficiently map certain identifiers or keys (e.g., person's name or serial number) to associated values (e.g., certificate information), known as key-value pairs. For example, in one embodiment, the cached CRL may include an entry for each revoked certificate since the certificate manager 125 started collecting this information, or since the last CRL was published. Alternatively, various techniques other than hash tables may be used in the cache memory to store entries of the revocation information of the certificate revoked by the certificate manager 125. The cache memory 135 may represent one or more storage devices, which may consist of one or more types of removable storage and/or one or more types of non-removable storage.

In the depicted embodiment, the CRL pre-encoder 130 is hosted by the same server as the certificate manager 125. In other embodiments, the CRL pre-encoder 130 resides on a separate server from the certificate manager 125. For example, a dedicated server may be used for the CRL pre-encoder 130 to perform such operations as periodically searching the cache memory 135 for un-encoded entries of the cached CRL. Because the cached CRL is stored in cache memory 135, it may be faster to search the cache when the CRL pre-encoder 130 is hosted by the same server as cache memory 135.

The OCSP 122 verifies whether a certificate is valid and not revoked. The certificate manager 125 can have an internal OCSP service to perform this function, but using an external OCSP eases the load on the issuing CA (certificate manager 125). The RA 123 can accept certificate requests and can independently verify whether that request should be approved. The RA 123 then forwards approved requests to the certificate manager 125 to issue the certificate. Like the OCSP, this is a function that can be performed by the certificate manager 125, but using a separate subsystem reduces the load on the certificate manager 125.

Figure 2:
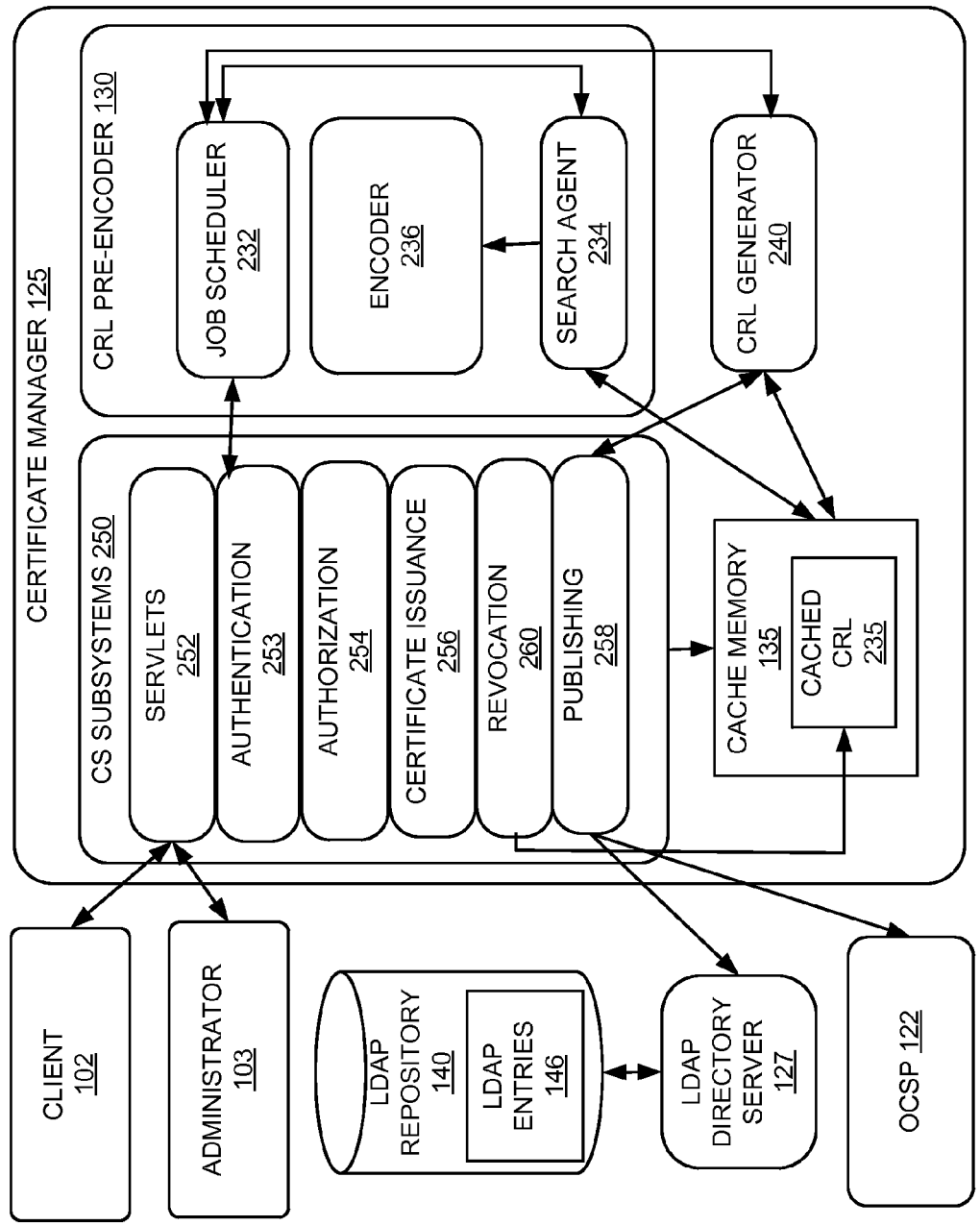
FIG. 2 is a block diagram of one embodiment of the CRL pre-encoder of the certificate manager of FIG. 1.

The certificate system 120 includes a CA database. The CA database may be implemented, for example, using various types of database technologies. In one embodiment, as depicted in FIGS. 1 and 2, the certificate system 120 implements the CA database using a Lightweight Directory Access Protocol (LDAP) directory server 127 that manages LDAP entries 146 stored in the LDAP repository 140. The LDAP directory server 127 may be one or more machines including one or more server computers, gateways or other computing systems. In some embodiments, the LDAP entry 146 may contain along with the original certificate, the certificate profile used to enroll the original certificate, its public key, the subject DN, the original certificate request, the original certificate's extension, etc., for example. The certificate profile includes a set of rules concerning the issuing of a certificate by the certificate manager 125, for example, the kind of content that is required to submit the request, the way the request is processed and approved (authenticated and authorized), the information that is included in the certificate content, and how long the certificate is valid. In other embodiments, the LDAP entry 146 may contain, along with the original certificate, an original enrollment profile used to enroll the original certificate, its public key, the subject DN, the enrollment request for the original certificate, the original certificate's extension, for example. The original certificate request entry may also contain the original validity period of the certificate and the grace period for renewing the certificate. The grace period is the time before and after the expiration date when renewal is allowed. Alternatively, the CA database may use technology other than LDAP to store records of digital certificates in the CA database.

The client 102 and administrator 103 workstations each may be a personal, computer (PC), such as a laptop or desktop computer, a tablet PC, a set-top box (STB), a gaming system, a portable electronic device, such as a mobile phone, personal digital assistant (PDA), wireless terminal, portable gaming system, or another wireless electronic device. In one embodiment, an administrator on the administrator workstation 103 configures the CRL pre-encoder 130. The administrator workstation 103 may provide web-browsing capabilities to render images, documents, etc., in a web browser using uniform resource locators (URLs) or links specified by the administrator (e.g., by activating a link). The web browser allows an administrator to access an administrator console provided by the certificate system 120. The administrator console can allow the administrator to configure the CRL pre-encoder 130, such as scheduling jobs for periodically searching the cached CRL for un-encoded information or jobs for periodically generating a CRL from the cached CRL. The administrator workstation 103 can use the management user interface (UI) for management of the certificates. In one embodiment, the administrator workstation 103 can access the management UI via a browser, in which case the UI is a web-based browser. In another embodiment, the administrator workstation 103 can access the management UI via a command line interface (CLI).

FIG. 2 is a block diagram of one embodiment of the CRL pre-encoder 130 of the certificate manager 125 of FIG. 1. The certificate manager 125 includes certificate system (CS) subsystems 250, CRL pre-encoder 130, cache memory 135, and CRL generator 240 in the depicted embodiment. In the depicted embodiment, the CRL pre-encoder 130 includes a job scheduler 232, a search agent 234, and an encoder 236, which are each described in more detail below.

The CRL pre-encoder 130 can periodically search the cached CRL 235 stored in the cache memory 135, and encode un-encoded entries of the cached CRL 235. The CRL generator 240 can periodically generate a CRL for publishing using the cached CRL 235. The CRL pre-encoder 130 can be configured to search at a specified interval that is less than an interval of generating a CRL for publishing. When publishing CRLs, the encoder 236 encodes the CRL into a binary encoding that allows the CRL to be digitally signed and transmitted over the network according to standard formats. For example, the encoder 236 encodes the CRL into either a base-64 encoded file or a DER-encoded file. In order to encode the CRL into a standard format, the encoder 236 encodes each entry of the CRL using, for example, DER. However, by pre-encoding the entries of the cached CRL 235 using the CRL pre-encoder 130, most of the entries of the cached CRL 235, if not all, can be already encoded in the cached CRL before creation of the CRL for publishing. Since the certificate manager 125 generates the CRL using the cached CRL 235, the amount of time consumed by the certificate manager 125 to generate and publish the CRL is reduced. When the certificate manager 125 delegates the responsibility of generating and publishing the CRL to another CRL issuer, the CRL pre-encoder 130 reduces the amount of time consumed by the CRL issuer to generate and publish the CRL, since the entries of the cached CRL have already been encoded.

The certificate manager 125 can present an administrator interface to a user (e.g., administrator) on the administrator workstation 103 of the CA. In one embodiment, the administrator interface is served by one of the servlets 252, and allows the administrator the ability to manage the certificate manager 125, such as allowing the administrator to configure the CRL pre-encoder 130, add users, configure logs, manage profiles and plug-ins, and the CA database, among many other functions. In one embodiment, the servlet 252 is software code, such as Java code, that handles a particular kind of interaction with end entities or agents on behalf of the CS subsystem 250. The administrator interface may be a Java-based administrative console. Alternatively, the administrator interface may be a HTML-based administrative console.

Although these types of interfaces are different, both may be accessed using a server URL and the administrative port number.

In one embodiment, the administrator interface allows the administrator to schedule jobs in the job scheduler 232 to perform pre-encoding of the cached CRL 235. In one embodiment, the job scheduler 232 is a Cron (short for Chronograph) job scheduler, which is a time-based job scheduler in Unix-like computer operating systems. Cron job schedulers enable users to schedule jobs, such as commands or shell scripts, to run automatically at a certain time or date and/or at specified intervals. In another embodiment, the job scheduler 232 is implemented with threads, where a thread is started to do the job each time the job scheduler wakes up. Alternatively, other types of job schedulers may be used, such as BATCH, Task Scheduler, launchd, or other application software that can perform job scheduling functionality. The job scheduler 232 may provide a single point of control for definition and monitoring of background executions in the certificate manager 125, or in the certificate system 120. For example, in one embodiment, the job scheduler 232 can also schedule jobs for the CRL generator 240, which is described in more detail below.

The administrator interface can be used by the administrator to configure the job scheduler 232 to initiate a search by the search agent 234 of the cache memory 135 at a specified time or at specified intervals. Alternatively, the administrator can send individual requests for the search agent 234 to search the cached CRL 235 for un-encoded information. The administrator can use the administrator interface to configure the searches performed by the search agent 234, such as search criteria used to detect entries that contain un-encoded information. The search agent 234 searches the cache memory 135 to detect entries of the cached CRL 235 that contain un-encoded information. When the search agent 234 detects an un-encoded entry, the search agent 234 directs the encoder 236 to encode the un-encoded information. When the encoder 236 finishes encoding the information, the encoded entry is stored in the respective entry in the cached CRL 235. In the depicted embodiment, the search agent 234 sends the un-encoded entry to the encoder 236 for encoding and receives the encoded entry back from the encoder 236 to store in the encoded entry in the cached CRL 235. In another embodiment, the encoder 236 can retrieve the un-encoded entry from the cache memory and store the encoded entry back into the cache memory 135 when the search agent 234 identifies the un-encoded entry. Alternatively, other configurations can be used as would be appreciated by one of ordinary skill in the art having the benefit of this disclosure.

The following describes some of the operations of CS subsystem 250 in accordance with some embodiments. In the depicted embodiment, the CS subsystem 150 includes servlets 252, an authentication module 253, an authorization module 254, a certificate issuance module 256, a publishing module 258, and a revocation module 260. When the certificate manager 125 receives certificate enrollment and renewal requests from a requester, such as a user on the client workstation 102, the certificate manager 125 invokes a servlet 252 that interacts with other components of the CS subsystem 250 as necessary. In one embodiment, the servlet 252 may be an enrollment or renewal servlet that handles the certificate enrollment and renewal requests according to a particular certificate profile. In another embodiment, the servlet 252 may be a revocation servlet that handles revocation of certificates issued by the certificate manager 125 as described in more detail below. The servlet 252 uses the authentication module 253 to authenticate the user's identity. The authentication module 253 may include a set of rules (e.g., implemented as a Java™ class) for authenticating the client 102 that needs to interact with the CS subsystem 150. The authentication module 253 can authenticate the certificate request using agent-based authentication, password-based authentication, certificate-based authentication, client authentication, server authentication, or the like. Once the request is authenticated, the servlet 252 passes the certificate enrollment or renewal request to an authorization module 254, which determines whether the certificate request has been approved. The profile processing of the authorization module 254 determines whether to approve the certificate request, such as by determining whether the certificate request complies with the constraints of the corresponding certificate profile. When approved, the authorization module 254 passes the authorized request to a certificate issuance module 256, which issues the certificate accordingly. The profile processing of the certificate issuance module 256 issues the renewed certificate when the certificate request is approved and makes the renewed certificate available for retrieval by a user. The publishing module 258 publishes the certificate in the LDAP repository 140 via the LDAP directory server 127. In one embodiment, the publishing module 258 publishes the certificate in the LDAP directory by storing a copy of the certificate in the LDAP repository. The publishing module 258 may also publish a CRL in the LDAP directory as described in more detail below. Publishing the CRL in the LDAP directory is one method for conveying the revocation status of certificates. Another method for conveying status of certificates includes publishing information associated with the revoked certificates via the OCSP responder 122.

The certificate manager 125 may also have the responsibility to revoke the certificate if any of the certificate information becomes false and to make the revoked certificate status available to parties and applications that need to verify its validity status. The CRL generator 240 is configured to generate CRLs. These CRLs may be created to conform to the X.509 standards, such as by enabling extension-specific modules in the CRL configuration. In one embodiment, the CRL generator 240 can generate the CRL every time a certificate is revoked. In another embodiment, the CRL generator 240 can generate the CRL at periodic intervals. Once the CRL generator 240 generates the CRL, the publishing module 258 can publish the CRL to a file, an LDAP directory, or an OCSP responder. The same certificate manager 125 that issued the certificates listed in the CRL issues and digitally signs the CRL. The certificate manager 125 may use a single key pair to sign both the certificates and the CRLs it issues. Alternatively, the certificate manager 125 may use two separate key pairs, one for signing certificates and another for signing CRLs.

The certificate manager 125 may revoke any certificate that it has issued. There are generally accepted reason codes for revoking a certificate that are often included in the CRL, such as the shown in the following examples.

0. Unspecified; no particular reason is given.
1. The private key associated with the certificate was compromised.
2. The private key associated with the CA that issued the certificate was compromised.
3. The owner of the certificate is no longer affiliated with the issuer of the certificate and either no longer has rights to the access gained with the certificate or no longer needs it.
4. Another certificate replaces this one.
5. The CA that issued the certificate has ceased to operate.

6. The certificate is on hold pending further action. It is treated as revoked but may be taken off hold in the future.

When the request is a revocation request, the servlet 252 passes the revocation request to the revocation module 260. As described above, the servlet 252 may first authenticate the revocation request using the authentication module 253. Generally, whenever a certificate is revoked, the revocation module 260, via the publishing module 258, may automatically update the status of the certificate in the CA database (LDAP directory in FIG. 2), mark a copy of the certificate in the CA database as revoked, and remove the revoked certificate from the publishing directory, if the revocation module 260 is configured to remove the certificate from the CA database. In one embodiment, in addition to publishing the revocation information to the LDAP directory and/or the OCSP responder 122, the revocation module 260, via the publishing module 258, stores an entry in the cached CRL 235 with the revocation information for each of the respective revoked certificates. The entry may include all information used to update the certificate records stored in the LDAP directory, or may include a subset of this information.

When instructed to generate a CRL, or when the interval for creating a CRL is reached, the CRL generator 240 creates a CRL from the cached CRL 235. In one embodiment, the cached CRL 235 represents a full CRL, which contains all revoked certificate information since the certificate manager 125 began collecting this information. Because CRLs can be very large, publishing CRLs can take a very long time, and it is possible for the process to be interrupted. In another embodiment, the cached CRL 235 represents an intermittent CRL, also referred to as a delta CRL, which contains all revoked certificate information since the last update of the full CRL. In one embodiment, the cached CRL 235 can be copied to the LDAP directory or the OCSP responder 122 at intervals specified for copying the cached CRL. In one embodiment, the LDAP directory stores only the latest full CRL and delta CRL—as each new CRL is created, the old CRL can be overwritten. Alternatively, the CRLs can be stored as designated as old CRLs.

In one embodiment, the certificate manager 125 generates and publishes CRLs according to a time-based schedule. For example, the CRL generator 240 can generate and publish CRLs every single time a certificate is revoked, at a specific time of day, or once every so-many minutes. This time-based publishing schedule may apply to every CRL that is generated, for example, the full CRL and the delta CRL can be generated at the same time and every time. Alternatively, the time-based publishing schedule may space out when the full CRLs are published and may publish multiple interim delta CRLs. For example, if the interval is set to 3, then the first CRL publishing is both a full CRL and a delta CRL, then the next two publishing updates are only delta CRLs, and then the fourth interval is both a full CRL and a delta CRL again. In essence, every third publishing interval has both a full CRL and a delta CRL, as illustrated in the following expression.

| Interval | 1 | 2 | 3 | 4 | 5 | 6 | 7 | ... |
|---|---|---|---|---|---|---|---|---|
| Full CRL | 1 | | | | 4 | | | 7 | ... |
| Delta CRL | 1 | 2 | 3 | 4 | 5 | 6 | 7 | ... |

When CRLs are published, the publishing module 258 publishes each update to the CRL and delta CRL at the specified locations, specified in the publishing setup. In one embodiment, for file-based publishing, the publishing module 258 publishes each CRL to a file using the number for the CRL, so that no file is overwritten. In another embodiment, for LDAP publishing, the publishing module 258 publishes each CRL by replacing the old CRL in the attribute containing the CRL in the directory entry.

Also, when CRLs are published, the publishing module 258 needs to publish the CRL according to a standard format that allows transmission of the CRL over a network, such as over the Internet, and/or that allows the CRL to be digitally signed. In telecommunications and computer networking, ASN.1 is a standard and flexible notation that describes data structures for representing, encoding, transmitting, and decoding data. The ASN.1 standard defines encoding rules, including Basic Encoding Rules (BER), Distinguished Encoding Rules (DER), base-64 encoding rules, etc. In particular, DER, which is a subset of BER, is a message transfer syntax specified by the ITU in X.690 that provides a way to encode an ASN.1 value. An ASN.1 DER encoding is a tag, length, value encoding system for each element. DER ensures that a data structure that needs to be digitally signed produces a unique serialized representation. DER is widely used for digital certificates such as X.509. It should also be noted that it is possible to transmit the encoded message or file over the network using any means, such as, for example, Transmission Control Protocol (TCP) or other transmission protocols. The receiving party can decode the encoded message or file using DER. In other embodiments, other encoding formats may be used for the CRLs.

When the publishing module 258 creates the CRLs for publishing according to a specified file type, such as a base-64 encoding file or DER-encoded file, the CRL generator 240 needs to encode any un-encoded information in the CRL. As described above, the CRLs can be quite large, and the CRL generator 240 would have to encode all entries of the cached CRL 235 when creating a CRL for publishing. However, using the embodiments described herein, by pre-encoding the entries of the cached CRL 235 using the CRL pre-encoder 130, the CRL generator 240 does not need to encode all the entries of the cached CRL at that instance of time, but rather only the entries of cached CRL 235 that have not been encoded. In some instances, the CRL pre-encoder 130 may have encoded all entries of the cached CRL 235. In other instances, the CRL pre-encoder 130 may have encoded all entries that occurred before the last schedule search of the cached CRL 235 by the CRL pre-encoder 130, and the CRL generator 240 encodes any remaining un-encoded entries. By pre-encoding the entries of the cached CRL 235, the entries can be already encoded for transmission over the network, thus, reducing the amount of time consumed by the CRL generator 240 to generate the CRL for publishing. Base-64 encoding formats and DER encoding formats are examples of encoding formats that can be used by the CRL pre-encoder 130 and the CRL generator 240. In other embodiments, the CRL pre-encoder 130 and CRL generator 240 may use other encoding file formats, such as binary encodings, BER encodings, or the like.

In one embodiment, when the CRL pre-encoder 130 detects an entry of un-encoded information in the cached CRL 235, the CRL pre-encoder 130 encodes the respective un-encoded information and stores the encoded information in the respective entry of the cached CRL 235. In one embodiment, the encoded information includes a sequence of a certificate serial number, revocation information, such as a revocation date of the certificate, reason for revocation, etc., and a CRL extension, if any. Alternatively, the encoded information may include other information associated with the certificate or the revocation of the certificate.

When requested or at the scheduled time, the CRL generator 240 creates the CRL from the cached CRL 235. In one embodiment, the CRL includes three fields: 1) a first field containing a sequence of an issuer name that identifies the CA that signed and issued the CRL, an issue date, and an issued date of a next CRL to be generated; 2) a second field containing an algorithm identifier that identifies a cryptographic algorithm used by the CA to sign the CRL; and 3) a third field containing a digital signature value. In another embodiment, the first field can also include a list of revoked certificates by the CA, each of the revoked certificates of the list including at least one of a certificate serial number, a data on which the revocation occurred, and a time for the revocation. Alternatively, the CRL can include more or less information than described above in the above embodiments.

In one embodiment, for signature calculation, the data that is to be signed is ASN.1 DER encoded, and the ASN.1 DER encoding has a tag, a length, and a value for each element. One example of the syntax for the CRL is provided below.

```
CertificateList ::= SEQUENCE {
     tbsCertLis        TBSCertList,
     signatureAlgorithm      AlgorithmIdentifier,
     signatureValue    BIT STRING }
TBSCertList ::= SEQUENCE {
     version           Version OPTIONAL,
                       -- if present, MUST be v2
     signature         AlgorithmIdentifier,
     issuer            Name,
     thisUpdate        Time,
     nextUpdate        Time OPTIONAL,
     revokedCertificates       SEQUENCE OF SEQUENCE {
           userCertificate         CertificateSerialNumber,
           revocationDate          Time,
           crlEntryExtensions          Extensions OPTIONAL
                       -- if present, version MUST be v2
                } OPTIONAL,
     crlExtensions           [0] EXPLICIT Extensions OPTIONAL
                       -- if present, version MUST be v2
             }
```

In this embodiment, the CertificateList is a sequence of three fields, including the tbsCertlist, signatureAlgorithm, and signatureValue fields. The tbsCertList field is itself a sequence containing the name of the issuer, issue date, issue date of the next list, the optional list of revoked certificates, and optional CRL extensions. When there are no revoked certificates, the revoked certificates list may be absent. When one or more certificates are revoked, each entry on the revoked certificate list is defined by a sequence of user certificate serial number, revocation date, and optional CRL entry extensions, if any.

The signatureAlgorithm field contains the algorithm identifier for a cryptographic algorithm used by the CRL issuer to sign the CertificateList. The AlgorithmIdentifier may be defined as any one of the supported signature algorithms, such as, for example, Digital Signature Algorithm (DSA) with Secure Hash Algorithm (SHA) (e.g., DSA with SHA-1) or the like. It should be noted that the illustrated embodiments, the CRL issuer is the certificate manager 125. Alternatively, the certificate manager 125 may delegate the responsibility for issuing CRLs to a different entity. Similarly, the certificate manager 125 handles the publishing, but, in other embodiments, the publishing responsibility may be delegated to a different entity.

The signatureValue field contains a digital signature computed upon the ASN.1 DER encoded tbsCertList. The ASN.1 DER encoded tbsCertList is used as the input to the signature function. This signature value is encoded as a BIT STRING and included in the CRL signatureValue field. CAs that are also CRL issuers may use one private key to digitally sign certificates and CRLs, or may use separate private keys to digitally sign certificates and CRLs. By generating this signature, the CRL issuer certifies the validity of the information in the tbsCertlist field.

In the above example, the Certificate List "To Be Signed" ("TBSCertList") is a sequence of fields, which may be required fields or optional fields. For example, the required fields may identify the CRL issuer, the algorithm used to sign the CRL, and the date and time the CRL was issued, and the optional field may include the date and time by which the CRL issuer will issue the next CRL, lists of revoked certificates, and CRL extensions. The revoked certificate list may also be optional to support the case where a CA has not revoked any unexpired certificates that it has issued. The profile may include the nextUpdate field and the CRL number and authority key identifier CRL extensions in all CRLs issued. Additional details regarding the content of the CRLs can be found in the X.509 standard for Public Key Infrastructure Certificate and Certificate Revocation List (CRL) Profile.

Figure 3:
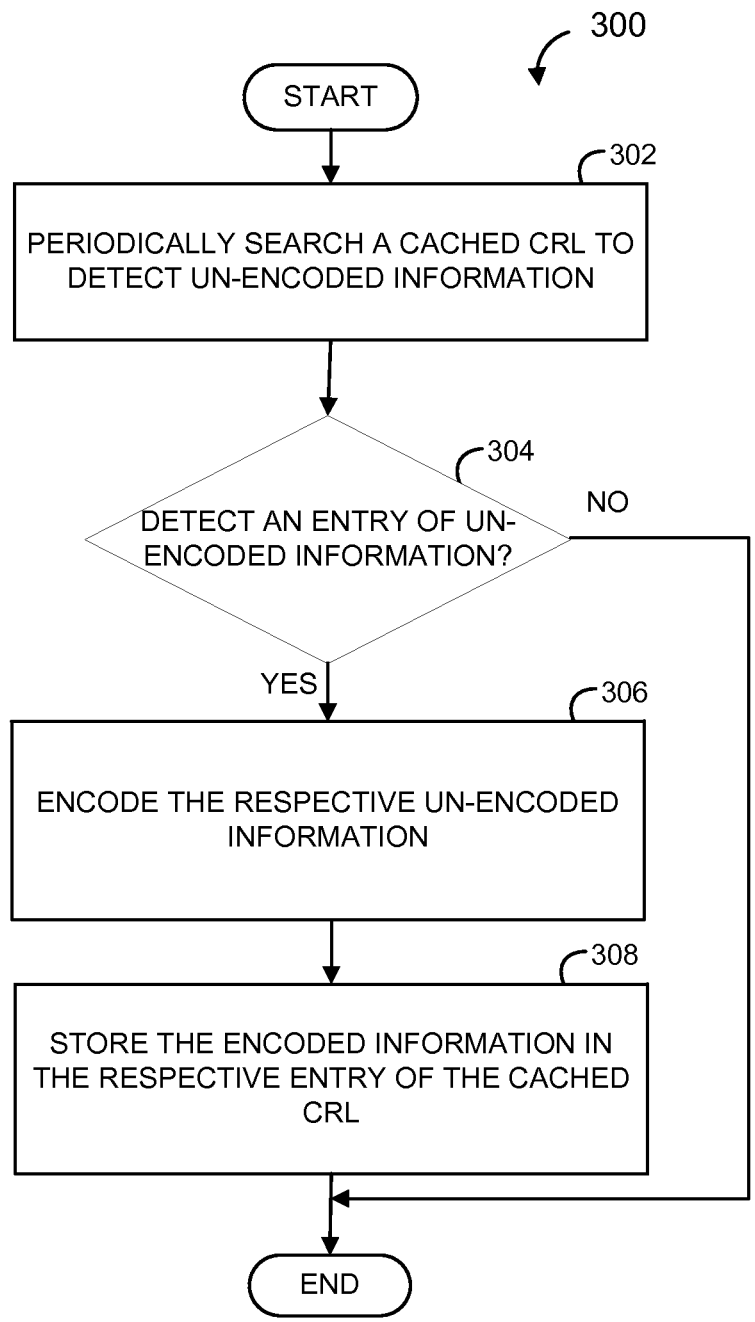
FIG. 3 is a flow diagram of one embodiment of a method of pre-encoding a cached CRL.

FIG. 3 is a flow diagram of one embodiment of a method 300 of pre-encoding a cached CRL. The method 300 is performed by processing logic that may comprise hardware (circuitry, dedicated logic, etc.), software (such as is run on a general purpose computer system or a dedicated machine), firmware (embedded software), or any combination thereof. In one embodiment, the certificate manager 125 of FIGS. 1 and 2 performs the method 300. In another embodiment, the CRL pre-encoder 130 performs the method 300. Alternatively, other components of the certificate system 120 can perform some or all of the operations of method 300.

Referring to FIG. 3, processing logic begins with searching a cached CRL to detect un-encoded information (block 302). In one embodiment, the processing logic schedules a job to search the cached CRL at a specific time. In another embodiment, the processing logic schedules a job to search the cached CRL at specified intervals. Next, when the processing logic detects an entry of un-encoded information (block 304), the processing logic encodes the respective un-encoded information (block 306) and stores the encoded information in the respective entry of the cached CRL (block 308), and the method ends. If at block 304 the processing logic does not detect an entry of un-encoded information, the method ends.

In another embodiment, the entries of the cached CRL are stored as a hash table, and the processing logic searches the entries of the cached CRL to detect un-encoded information in the hash table. After encoding the un-encoded entry, the processing logic stores the encoded entry back into the respective entry of the hash table.

In another block at block 306, the processing logic encodes the un-encoded information into a binary encoding. The binary encoding may allow the entries of the cached CRL to be digitally signed when the CRL for publishing is created from the cached CRL. In another embodiment, the processing logic encodes the un-encoded information using DER, encoding the entry into the DER-encoded file format.

Further, in one embodiment, the processing logic generates a CRL for publishing using the cached CRL, signs the CRL using a signature algorithm, and publishes the signed CRL. In one embodiment, the processing logic publishes the CRL to a file. In another embodiment, the processing logic publishes the CRL to a publishing directory, such as a LDAP directory. In another embodiment, the processing logic publishes the CRL to an OCSP service. The OCSP service may be managed by a certificate manager of the certificate system, or may be managed by an OCSP responder, such as OCSP 122 described above. Alternatively, the OCSP service can be delegated to another entity.

Figure 4:
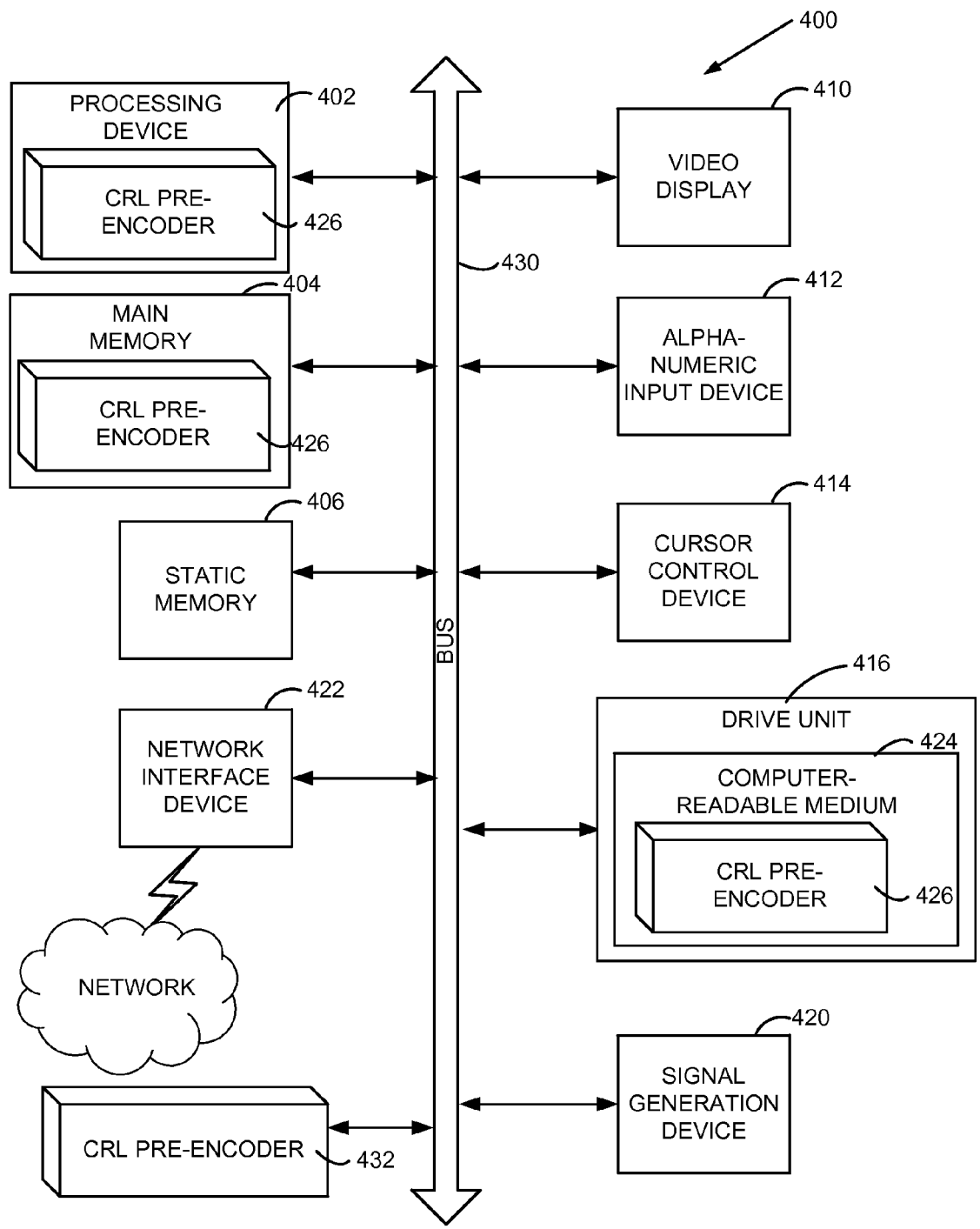
FIG. 4 illustrates a diagrammatic representation of a machine in the exemplary form of a computer system for pre-encoding a cached CRL.

FIG. 4 illustrates a diagrammatic representation of a machine in the exemplary form of a computer system 400 for pre-encoding a cached CRL. Within the computer system 400 is a set of instructions for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a STB, a PDA, a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for operations of pre-encoding the cached CRL, such as the method 300 described above. In one embodiment, the computer system 400 represents various components that may be implemented in the certificate system 120 as described above. Alternatively, the certificate system 120 may include more or less components as illustrated in the computer system 400.

The exemplary computer system 400 includes a processing device 402, a main memory 404 (e.g., read-only memory (ROM), flash memory, dynamic random access memory (DRAM) such as synchronous DRAM (SDRAM) or DRAM (RDRAM), etc.), a static memory 406 (e.g., flash memory, static random access memory (SRAM), etc.), and a data storage device 416, each of which communicate with each other via a bus 430.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic (e.g., CRL pre-encoder 426) for performing the operations and steps discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored one or more sets of instructions (e.g., CRL pre-encoder 426) embodying any one or more of the methodologies or functions described herein. The CRL pre-encoder 426 may also reside, completely or at least partially, within the main memory 404 and/or within the processing device 402 during execution thereof by the computer system 400, the main memory 404 and the processing device 402 also constituting computer-readable storage media. The CRL pre-encoder 426 may further be transmitted or received over a network via the network interface device 422.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The CRL pre-encoder 432, components, and other features described herein (for example in relation to FIGS. 1 and 2) can be implemented as discrete hardware components or integrated in the functionality of hardware components such as ASICS, FPGAs, DSPs or similar devices. In addition, the CRL pre-encoder 432 can be implemented as firmware or functional circuitry within hardware devices. Further, the CRL pre-encoder 432 can be implemented in any combination hardware devices and software components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method comprising:

periodically searching, by a computing system, a cached certificate revocation list (CRL) to detect an entry prior to a published CRL being generated from the cached CRL for publishing, wherein the cached CRL comprises a plurality of revoked certificates by a certificate authority (CA), wherein the detected entry comprises un-encoded information associated with at least one of the plurality of revoked certificates of the cached CRL, and wherein the cached CRL is stored in a memory of the computing system;

for each detected entry, encoding, by the computing system, the respective un-encoded information for the detected entry;

storing, by the computing system, the encoded information in the respective detected entry of the cached CRL; and scheduling a job in the certificate manager to perform the periodic search of the cached CRL for entries of un-encoded information in the cached CRL, wherein the job is scheduled independently of the published CRL being generated.

2. The method of claim 1, wherein the cached CRL is stored as a hash table in the memory.

3. The method of claim 1, wherein the encoding comprises encoding the un-encoded information into a binary encoding.

4. The method of claim 1, wherein said encoding comprises encoding the un-encoded information using the Abstract Syntax Notation One (ASN.1) standard.

5. The method of claim 1, wherein said encoding comprises encoding the un-encoded information using Distinguished Encoding Rules (DER) of the Abstract Syntax Notation One (ASN.1) standard.

6. The method of claim 1, wherein the encoded information comprises a sequence of a certificate serial number of the certificate and revocation information including at least a revocation date of the certificate.

7. The method of claim 1, further comprising:
generating a CRL for publishing using the cached CRL;
signing the CRL using a signature algorithm; and
publishing the signed CRL.

8. The method of claim 7, wherein the CRL comprises three fields, comprising:
a first field containing a sequence of an issuer name that identifies the CA that signed and issued the CRL, an issue date, and an issue date of a next CRL to be generated;
a second field containing an algorithm identifier that identifies a cryptographic algorithm used by the CA to sign the CRL; and
a third field containing a digital signature value.

9. The method of claim 8, wherein the first field further contains a list of revoked certificates by the CA, each of the revoked certificates of the list including at least one of a certificate serial number, a date on which the revocation occurred, or a time for the revocation.

10. The method of claim 7, wherein said publishing the CRL comprises publishing the CRL to at least one of a file or a publishing directory.

11. The method of claim 7, wherein said publishing the CRL comprises publishing the CRL to an Online Certificate Status Protocol (OCSP) service, wherein the OCSP service is an internal OCSP service managed by a certificate manager of the certificate system.

12. The method of claim 7, wherein said publishing the CRL comprises publishing the CRL to an Online Certificate Status Protocol (OCSP) service, wherein the OCSP service is managed by an OCSP responder external to a certificate manager of the certificate system.

13. The method of claim 1, wherein the job is scheduled at a specified time.

14. The method of claim 1, wherein the job is scheduled at specified intervals.

15. A certificate system, comprising:
a data storage device to store a cached certificate revocation list (CRL), the cached CRL comprising a plurality of revoked certificates by a certificate authority (CA); and
a certificate manager, coupled to the data storage device, to periodically search the cached CRL to detect an entry prior to a published CRL being generated from the cached CRL for publishing, wherein the detected entry comprises un-encoded information associated with at least one of the plurality of revoked certificates of the cached CRL, and wherein the certificate manager is to encode the respective un-encoded information for each detected entry of un-encoded information, to store the encoded information in the respective detected entry of the cached CRL, and to schedule a job to perform the periodic search of the cached CRL for entries of un-encoded information in the cached CRL, wherein the job is scheduled independently of the published CRL being generated.

16. The system of claim 15, wherein the certificate manager comprises a CRL pre-encoder, comprising:
a job scheduler to initiate the job to perform the periodic search of the cached CRL at a specified time;
a search agent to search the cached CRL according to the job to detect entries of un-encoded information associated with the at least one of the revoked certificates; and
an encoder to encode the respective un-encoded information for each detected entry of un-encoded information, wherein the CRL pre-encoder is to store the encoded information in the respective entry of the cached CRL.

17. The system of claim 16, wherein the job scheduler is executed as a thread, and wherein the thread is started to perform the job each time the job scheduler wakes up.

18. The system of claim 16, wherein the certificate manager comprises an administrator interface to allow an administrator of the CA to configure the job scheduler.

19. The system of claim 15, further comprising a CRL generator to generate a CRL for publishing using the cached CRL.

20. A non-transitory machine-readable storage medium having instructions, which when executed, cause a computing system to perform operations comprising:
periodically searching, by the computing system, a cached certificate revocation list (CRL) to detect an entry prior to a published CRL being generated from the cached CRL for publishing, wherein the cached CRL comprises a plurality of revoked certificates by a certificate authority (CA), wherein the detected entry comprises un-encoded information associated with at least one of the plurality of revoked certificates of the cached CRL;
for each detected entry, encoding the respective un-encoded information for the detected entry;
storing the encoded information in the respective detected entry of the cached CRL; and
scheduling a job to perform the periodic search of the cached CRL for entries of un-encoded information in the cached CRL, wherein the job is scheduled independently of the published CRL being generated.

21. The non-transitory machine-readable storage medium of claim 20, wherein the operations further comprise:
generating a CRL for publishing using the cached CRL;
signing the CRL using a signature algorithm; and
publishing the signed CRL.

* * * * *